INVENTORS.
ROBERT L. FORWARD,
FRANCIS E. GOODWIN,
BY J. K. Haskell
ATTORNEY.

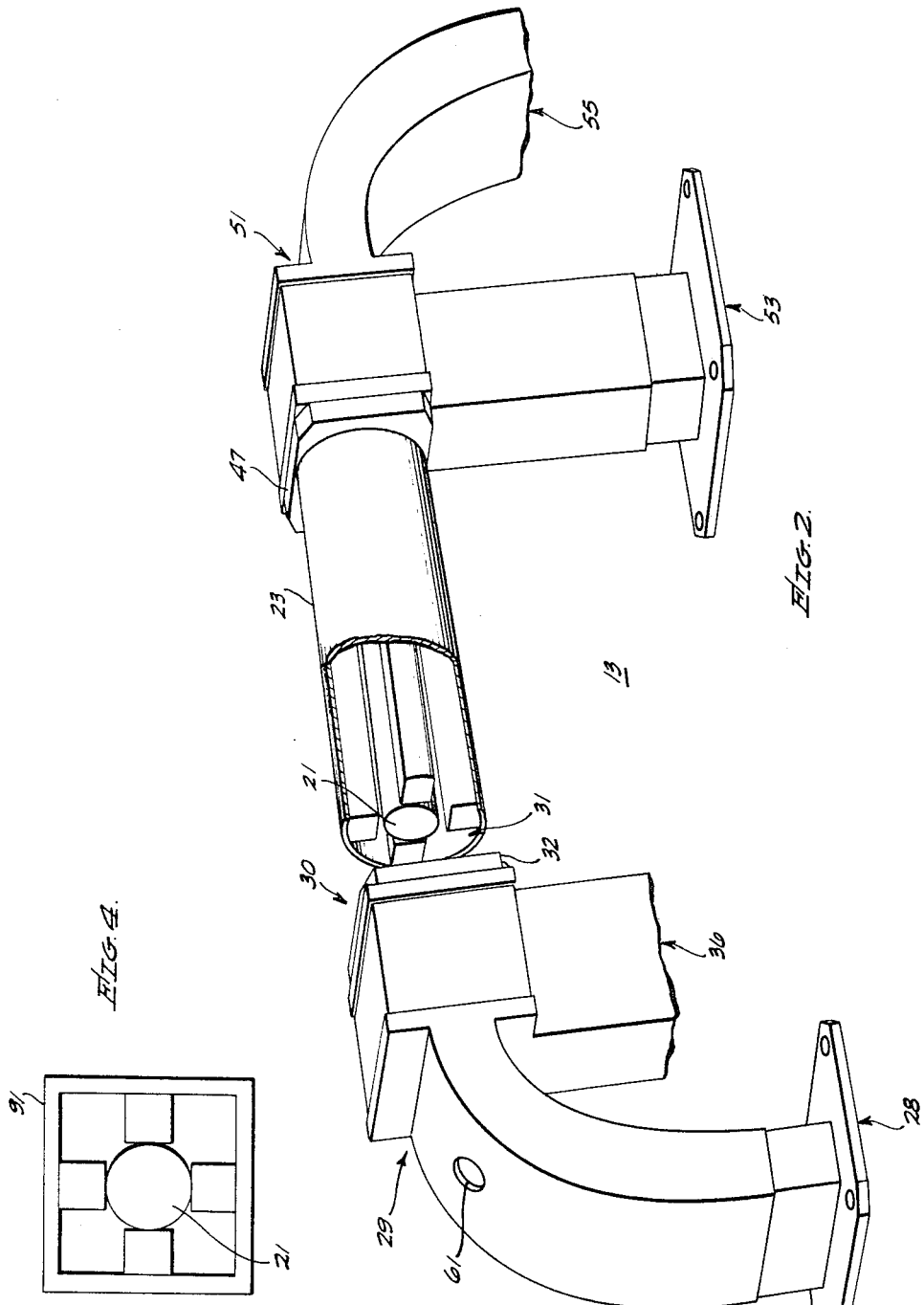

United States Patent Office 3,408,596
Patented Oct. 29, 1968

3,408,596
MULTIPLE TRANSLATION LASER MODULATOR
Robert L. Forward, Oxnard, and Francis E. Goodwin, Malibu, Calif., assignors to Hughes Aircraft Company, Culver City, Calif., a corporation of Delaware
Filed May 25, 1965, Ser. No. 458,710
3 Claims. (Cl. 332—16)

ABSTRACT OF THE DISCLOSURE

This is a laser frequency translator capable of accurately increasing or decreasing the frequency of a laser beam passing through it, comprising a laser generating a laser beam that is intercepted in turn by a first quarter-wave plate followed by a succession of half-wave rotating elements with adjacent ones of these elements having opposite senses of positive rotation and thereafter followed by a second quarter-wave plate. All but one of the half-wave elements may be of the fixed frequency narrow band type while the remaining half-wave element is a variable frequency wide band type.

---

The preferred techniques applicable to the problem of optical frequency translation can be categorized as optical equivalents or analogs of the conventional microwave phase shifter which utilizes a mechanically rotated birefringent half-wave plate. This device converts a circularly polarized wave of one sense into a similar wave of the opposite sense. Also, the phase of the output is varied by changing the angular position of the half-wave plate.

The basic process of translating frequency is one of adding a constant rate of change of phase to a wave of a given input frequency. Thus, if the shaft of the conventional mechanical microwave phase shifter is driven at a constant angular velocity, the output frequency is translated by an amount proportional to the rate of rotation of the shaft. This effect has been used in certain applications; however, the magnitude of frequency translation is seriously limited by the mechanical nature of the process. This effect can be duplicated at optical frequencies by the use of a mechanically rotating quartz half-wave plate, but it is obvious that it will provide only a very limited amount of frequency translation. Furthermore, moving mechanisms are not ideally adaptable to many applications.

In order to achieve a frequency shift useful in, for example, the laser communications field it is necessary to construct elements having rotation frequencies in the gigacycle range. The rotation, obviously, must be accomplished electronically. One method is to create a birefringent axis in some material by the application of an external electric field. The electric field producing the birefringent axis can be rotated, or otherwise changed, to cause a rotation of the birefringent axis.

Optical frequency translation devices can be divided into the following two classes: (1) single-element rotating-field translators and (2) double-element nonrotating-field translators. The rotating-field translators are characterized by the use of a single microwave-optical element in which both of the fields are circularly polarized (i.e., rotating fields). The nonrotating-field translators have two microwave-optical elements driven in quadrature by linearly polarized microwave fields. The two elements are oriented so that their dielectric ellipsoids are 45° with respect to each other. The net effect of the two ellipsoids driven in quadrature is the same as that of a single ellipsoid rotating continuously. A laser beam passing through the two elements experiences the same phase shift as it does in the rotating field translator.

In the past, both the rotating and nonrotating field translation techniques were generally limited to narrow band resonant circuit type devices which could be amplitude modulated. Contrary thereto, the present invention utilizes a broad band traveling wave structure, previously used in the microwave ferrite switching art, to perform unique and extremely advantageous functions as the half-wave element in a laser frequency translator.

More specifically, the half-wave element of the invention includes what is known in the art as a quadruple-ridged waveguide. This type of structure is an extension of conventional ridged waveguide (one or at most two internal ridges) and is illustrated in both its rectangular and circular form in U.S. Patent Number 2,850,705, issued Sept. 2, 1958, to H. N. Chait et al. for "Ridged Ferrite Waveguide Device." As conventionally utilized, this ridged waveguide is incorporated in ferrite type rotators and switches to provide static rotation of the plane of polarization of an R.F. field from an externally produced magnetic field (solenoid coil) for the purpose of switching microwave energy generally from one waveguide to another. Contrary thereto, the invention uses this type of ridged waveguide structure, in conjunction with specially adapted input and output orthogonal mode transducers, to permit the propagation of circularly polarized R.F. energy over a broad frequency bandwidth. The circularly polarized R.F. defines a continuously rotating electric field vector in the region between the ridges whereat is disposed electro-optic material adapted to interact with a laser beam propagating therethrough.

The orthogonal mode transducers utilized in the invention are generally of conventional design but adapted to allow the passage of a laser beam along an optical axis centrally disposed along the ridged waveguide portion of the half-wave element. Although the general structure and design of these transducers is conventional, as utilized in the invention, they do not perform the function conventionally assigned to them, i.e., as a polarization selecting device in duplexer arrangements and the like but rather generate and receive circularly polarized waves. Further design details of these transducers may be had by referring to IRE Convention Record, vol. 4, 1956, pp. 53–57, and U.S. Patent Number 3,004,228 issued Oct. 10, 1961, to R. L. Fogel for "Orthogonal Mode Transducer."

From the foregoing, it should be evident that a laser frequency translator of the type described as the invention would be an extremely useful advancement in the laser art.

It is therefore an object of the present invention to provide an improved laser frequency translator.

It is another object of the invention to provide a wideband single sideband electro-optic modulator capable of accurately increasing or decreasing the frequency of a laser beam passing through it without introducing additional frequency components.

It is still another object of the invention to provide a laser frequency translator capable of wide-band frequency modulation.

These and other objectives are achieved, according to the invention, in a laser frequency translator comprising first and second quarter-wave plates adapted to intercept a laser beam propagating along an optical axis. Between these plates there is placed a unique half-wave plate structure that includes electro-optic material situated on the axis of the laser beam. The half-wave plate has a broad band waveguide section disposed about the electro-optic material and adapted to propagate rotating circularly polarized microwave energy in the region of this material. Also, coupling arrangements are connected to the waveguide section and adapted to generate and receive circularly polarized microwave energy rotating in a selected direction.

The invention and specific embodiments thereof will be described hereinafter by way of example and with reference to the accompanying drawings wherein like reference numerals represent like elements and parts, and in which:

FIG. 2 is a perspective view, partially broken away, of one embodiment of the translator of FIG. 1;

FIG. 4 illustrates a cross section of a square quadruple-ridged waveguide interchangeable with the one shown in FIG. 2.

Figure 1:
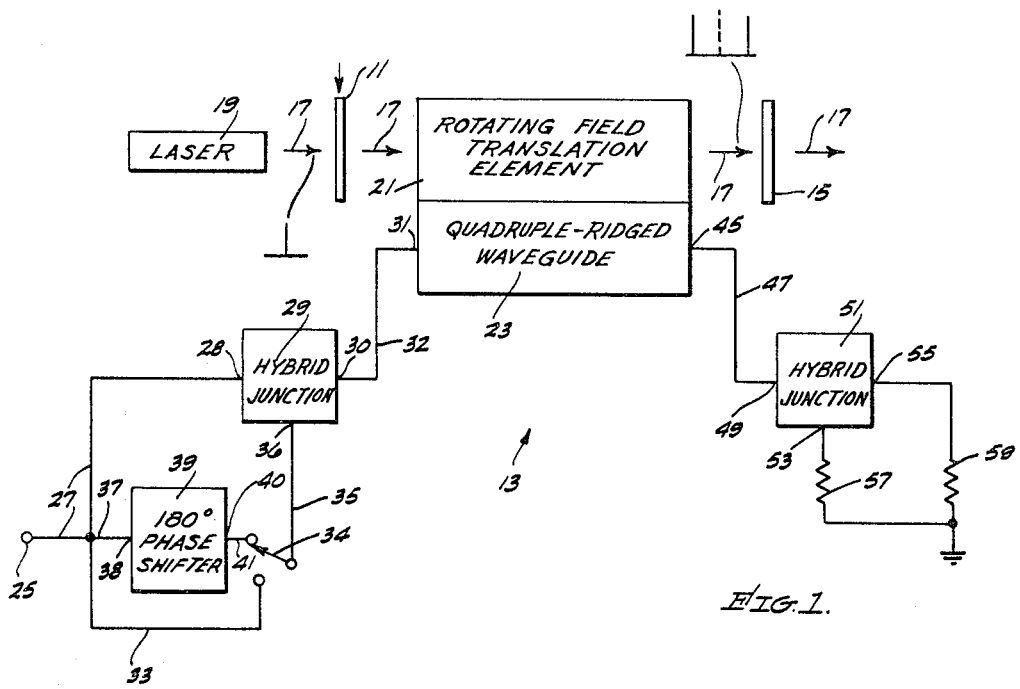
FIG. 1 is a schematic drawing of a laser frequency translator according to the invention.

With reference now to the drawings and more particularly to FIG. 1, there is shown a laser frequency translator consisting basically of three elements: a first quarter-wave plate 11, a microwave driven birefringent half-wave plate 13, and a second quorter-wave plate 15. A plane polarized laser beam 17 from a conventional laser 19 passes through these three elements in turn and emerges from the other side, still plane polarized. The frequency of the laser beam 17 will have been shifted accurately up or down. The amount of frequency change will depend upon the construction of the half-wave plate 13. Thus, a one micron laser beam passing through a laser frequency translator driven at an X-band frequency will have its frequency shifted from 300,000 gc. to 300,010 gc., for example.

The quarter-wave plates 11 and 15 are optical elements. They are thin plates constructed with optically active material with the exact thickness dependent upon the properties of the material used and the frequency of the laser beam. Examples of such material are crystalline quartz and sheets of cellophane. The design and construction of quarter-wave plates is art well known in the field of optics and are available commercially for applications in the visible spectrum. For a technical discussion of these plates, reference can be made to such publications as: "Optics" by F. W. Sears, Addison-Wesley Publishing Co., Inc., Mass., 1958, pp. 187–191; and "Fundamentals of Optics" by Jenkins and White, published by McGraw-Hill, N.Y., 1957, p. 556. The quarter-wave plates are constructed so that the optical axis of the material lies in the plane of the plate. They have the property that light with its plane of polarization parallel to the optic axis will travel exactly one quarter of a wavelength further than light with the plane of polarization perpendicular to the optic axis. Because of this property, light with its plane of polarization at 45° to the optic axis will emerge from the other side as circularly polarized light. And conversely, circularly polarized light will emerge from the other side plane polarized at 45° to the optic axis.

The birefringent half-wave plate 13 consists of a specially constructed microwave traveling wave section. It may also be described as a rotating-field optical frequency translation element including a birefringent electro-optical material 21 disposed in the center of what may be called a quadruple-ridged waveguide 23.

Microwave energy from a conventional source (not shown) is coupled to an input terminal 25 and thence to the quadruple-ridged waveguide 23 by means of two paths. As can be seen from FIG. 1, the input microwave energy will propagate from the input terminal 25 through waveguide 27 to a first port 28 of a conventional constructed input 90° hybrid junction 29. This energy then leaves the hybrid junction 29 by way of an output port 30 and propagates to an input 31 of the ridged waveguide 23 through waveguide 32. The second path actually consists of one of two alternative paths; a direct path by means of waveguide 33 through a microwave switch 34 (when in the proper position) and a waveguide 35 to a second port 36 of the hybrid junction 29, or through waveguide 37 to an input 38 of a conventional microwave 180° phase shifter 39, and then out of an output 40, through a waveguide 41 and the switch 34 and the waveguide 35 to the hybrid junction 29.

When the switch 34 is moved to the position connecting the second port 36 of the 90° hybrid 29 to the direct path via waveguide 33, the input microwave energy, propagating through the hybrid junction 29 is converted from a plane polarized wave to a constant amplitude circularly polarized wave rotating in a particular direction. However, when the switch 34 is in the position shown, the microwave energy appearing at the input ports 28 and 36 of the hybrid junction 29 will be shifted in phase with respect to each other by 180° due to the shift provided by the phase shifter 39. Again, microwave energy propagating through the hybrid junction 29 will experience a conversion or change from a plane polarized wave to a circularly polarized wave, but now, the direction of rotation is in the opposite direction. The significance of this will be seen later.

The now circularly polarized microwave energy propagating from an output port 30 of the hybrid junction 29 to the input 31 of the quadruple-ridged waveguide 23 provides a constant amplitude rotating electric field within the rdiged waveguide 23, the direction of rotation of which is dependent upon the position of the switch 34 and the frequency of which corresponds to the frequency of the input microwave energy.

After traveling through the ridged waveguide 23 and emerging from an output 45, the circularly polarized microwave energy propagates through a waveguide 47 to an input port 49 of an output 90° hybrid junction 51 having first and second output ports 53 and 55, respectively. These ports are terminated by conventional means represented by resistors 57 and 59 to substantially prevent any energy from being reflected back through the ridged waveguide 23.

The ridges in the ridged waveguide 23 provide an extremely strong rotating electric field along the center of the waveguide whereat is disposed the birefringent electro-optical material 21. These ridges also provide a means for supporting and conducting heat away from the birefringent material. This birefringent material becomes optically active under the influence of an electric or magnetic field. An example of such a material is liquid nitrobenzene. Optical devices utilizing materials like nitrobenzene are commercially available in the form of Kerr cells or shutters.

From FIG. 2 it can be seen that the 90° hybrid junctions (orthogonal mode transducers) 29 and 51 may be of the rectangular-crossed field type and that a hole 61 in the input hybrid 29 is provided for allowing the laser beam 17 to pass through the input hybrid junction 29 and thence through the birefringent material 21, along the axis of the ridged waveguide 23, and out through another hole (not shown) in the output hybrid junction 51.

Since the optic axis of the birefringent material 21 inside the ridged waveguide 23 is determined by the direction of the electric field rotating at microwave frequencies, it is seen that the optic axis of the birefringent material 21 will be rotating at these same microwave frequencies. The material itself will, of course, not be rotating as a whole but only the dielectric property thereof.

By adjusting the magnitude of the input microwave energy incident on the input terminal 25, the electric field strength within the ridged waveguide 23 may be varied so that the birefringent material 21 will represent a half-wave plate to the laser beam 17 passing therethrough. The half-wave plate, of course, has the property that one direction circularly polarized light incident on it will emerge from the other end as circularly polarized light in the opposite direction. The phase relationship between these two directioned polarizations depends upon the orientation of the half-wave plate 13.

In examining the operation of the translator in detail as the laser beam passes through it, it can be seen that the first quarter-wave plate 11 transforms the incident plane polarized laser beam 17 in a clockwise circularly polarized light. The half-wave plate 13, when driven by the microwave fields rotating in the ridged waveguide 23, will transform the clockwise polarized light into counter-clockwise polarized light and at the same time will introduce an effective phase shift depending upon the position of the electric field. The second quarter-wave plate 15 will transform the counter-clockwise circularly polarized laser beam back into linear polarization. The emerging laser beam will thus be shifted in phase with respect to the incident laser beam.

Since the direction of the electric field in the ridged waveguide 23 is constantly changing, the optic axis induced in the birefringent material 21 is also rotating and therefore the amount of phase shift between the incident and emergent laser beam is constantly increasing or decreasing (depending upon the direction of rotation). This constantly changing phase shift is equivalent to a change in frequency. Thus, the emerging laser beam is at a different frequency than the incident laser beam, which difference is dependent upon the frequency of the microwave energy incident on the input terminal 25.

Figure 3:
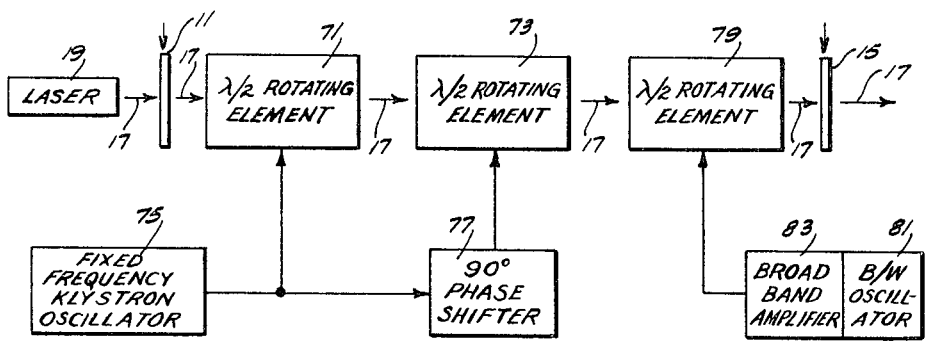
FIG. 3 is a schematic drawing of a system incorporating a series of modified laser frequency translators according to the invention.

In certain applications, it may be desired to translate to higher frequencies than obtainable from the use of a single laser frequency translator. The obvious method to achieve this translation is to use several translators in succession. However, each element of each translator in the laser beam path contributes to optical losses that limit the number of translators that may be used. The number of elements required for each translation may be reduced considerably, however, by following the technique to be described in connection with FIG. 3.

As noted before, a single laser frequency translator consists of a quarter-wave plate, a rotating half-wave plate, and a final quarter-wave plate. However, the same translation may be obtained as provided by such 3-element translators coupled in series through a system wherein an initial quarter-wave plate 11 is followed by a succession of half-wave rotating elements 71, 73 and 79 with adjacent half-wave elements having opposite senses of positive rotation and further followed by a final quarter-wave plate 15. The first two half-wave elements 71 and 73 may be of the fixed frequency narrow band type while the third half-wave element 79 is a variable frequency wide band type similar to the half-wave plate 13 in FIG. 2. The first two half-wave elements 71 and 73 are coupled by conventional microwave waveguide means to a conventional fixed frequency klystron oscillator 75, the element 73 being fed 90° out of phase with respect to the element 71 by means of a conventional 90° phase shifter 77 connected between the oscillator 75 and the element 73. This provides the necessary counter rotation of adjacent elements. On the other hand, the variable half-wave element 79 is coupled to a variable source of microwave energy comprised of a backward wave oscillator 81 driving a traveling wave tube broad band amplifier 83. By eliminating the two unnecessary quarter-wave plates between each rotating half-wave element, the translation system is simplified and significantly reduces optical losses.

FIG. 4 illustrates a cross section of a square quadruple-ridged waveguide 91 that is interchangeable with the round waveguide section 23 of FIG. 2. Of course, the orthogonal mode transducers coupled thereto must be adapted to match this different cross section, but the operation of the device is identical with the device described in conjunction with FIGS. 1 and 2.

From the foregoing it should be seen that the invention provides an improved wide-band frequency translator capable of single sideband amplitude and frequency electro-optic modulation of a laser beam without the introduction of additional frequency components.

In practicing this invention, any source of laser beam energy may be used but single mode operation may be desirable. Also, other electro-optic materials having the same properties as those specifically set out may be substituted therefor.

Accordingly, it is intended that the foregoing disclosure and drawings shall be considered only as illustrations of the principles of this invention and are not to be construed in a limiting sense.

What is claimed is:

1. A laser frequency translator, comprising in combination: laser means for generating a laser beam; first and second quarter-wave plates positioned along and intercepted by said laser beam; and a half-wave plate including an electro-optic material element intercepting said laser beam between said first and second quarter-wave plates, said half-wave plate also including broad band waveguide means disposed about said electro-optic element for propagating rotating circularly polarized microwave energy in said electro-optic material, and coupling means connected to said waveguide section for generating and receiving said circularly polarized microwave energy rotating in a selected direction, said half-wave plate further including a pair of fixed frequency counter rotating half-wave elements disposed between one of said quarter-wave plates and said waveguide means intercepting said laser beam, the sense of rotation of the half-wave element adjacent said waveguide section being opposite that of said section.

2. A laser frequency translator as claimed in claim 1, wherein said broad band waveguide means includes a quadruple-ridged waveguide section and said coupling means includes input and output 90° hybrid junctions.

3. A laser frequency translator as claimed in claim 1, wherein said translator includes a fixed frequency klystron oscillator coupled to one of said fixed frequency counter rotating half-wave elements and a 90° phase shifter having an input coupled to said klystron oscillator and an output coupled to the other of said fixed frequency counter rotating half-wave elements; and wherein said broad band waveguide means includes a variable source of microwave energy.

References Cited

UNITED STATES PATENTS

| | | | |
|---|---|---|---|
| 2,850,705 | 9/1958 | Chait et al. | 333—24.3 |
| 2,986,710 | 5/1961 | Cacheris | 332—51 |
| 3,004,228 | 10/1961 | Fogel | 333—21 |
| 3,204,104 | 8/1965 | Biard et al. | 332—7.51 |
| 3,304,428 | 2/1967 | Peters | 250—199 |

ALFRED L. BRODY, *Primary Examiner.*